Patented Aug. 4, 1925.

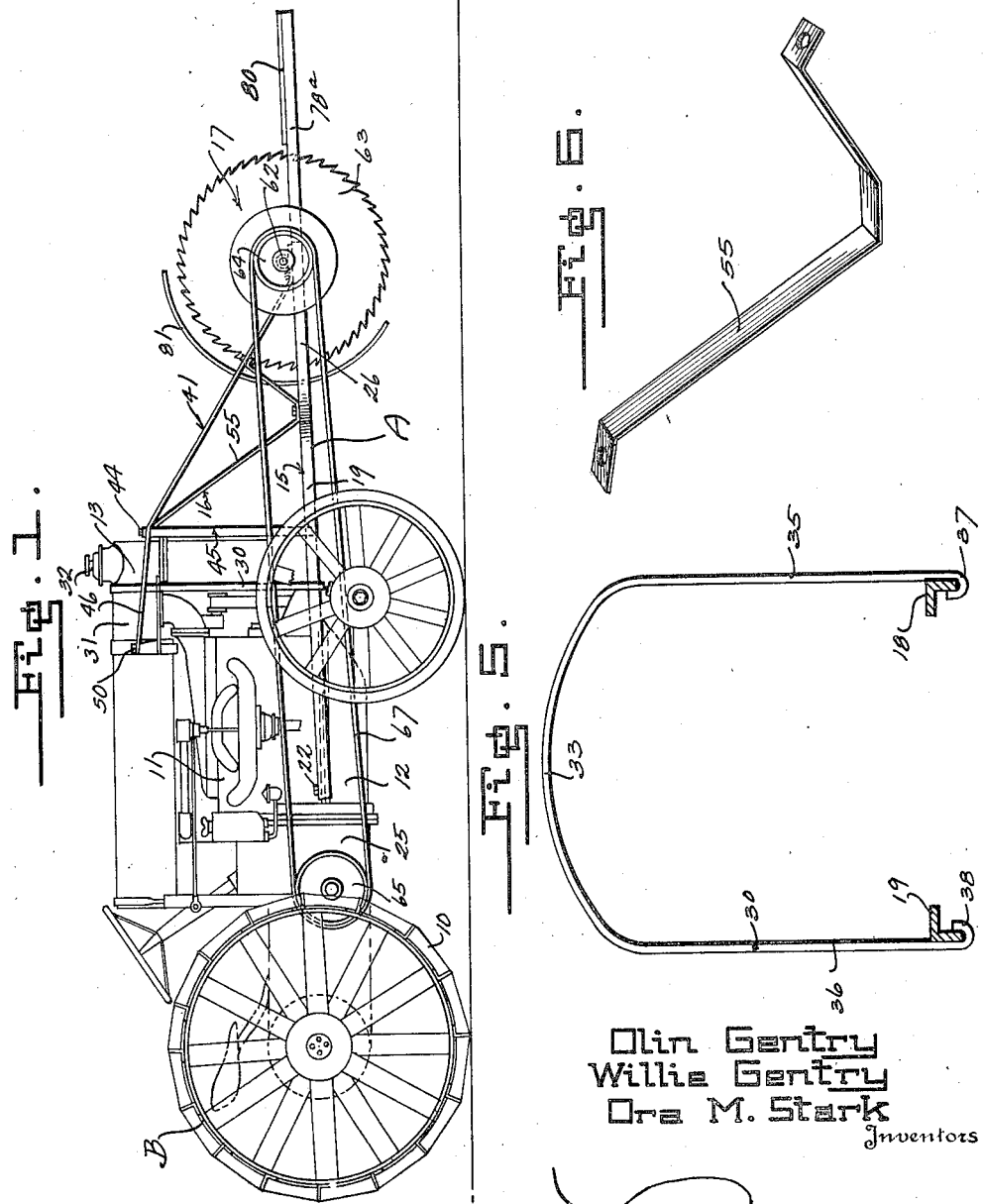

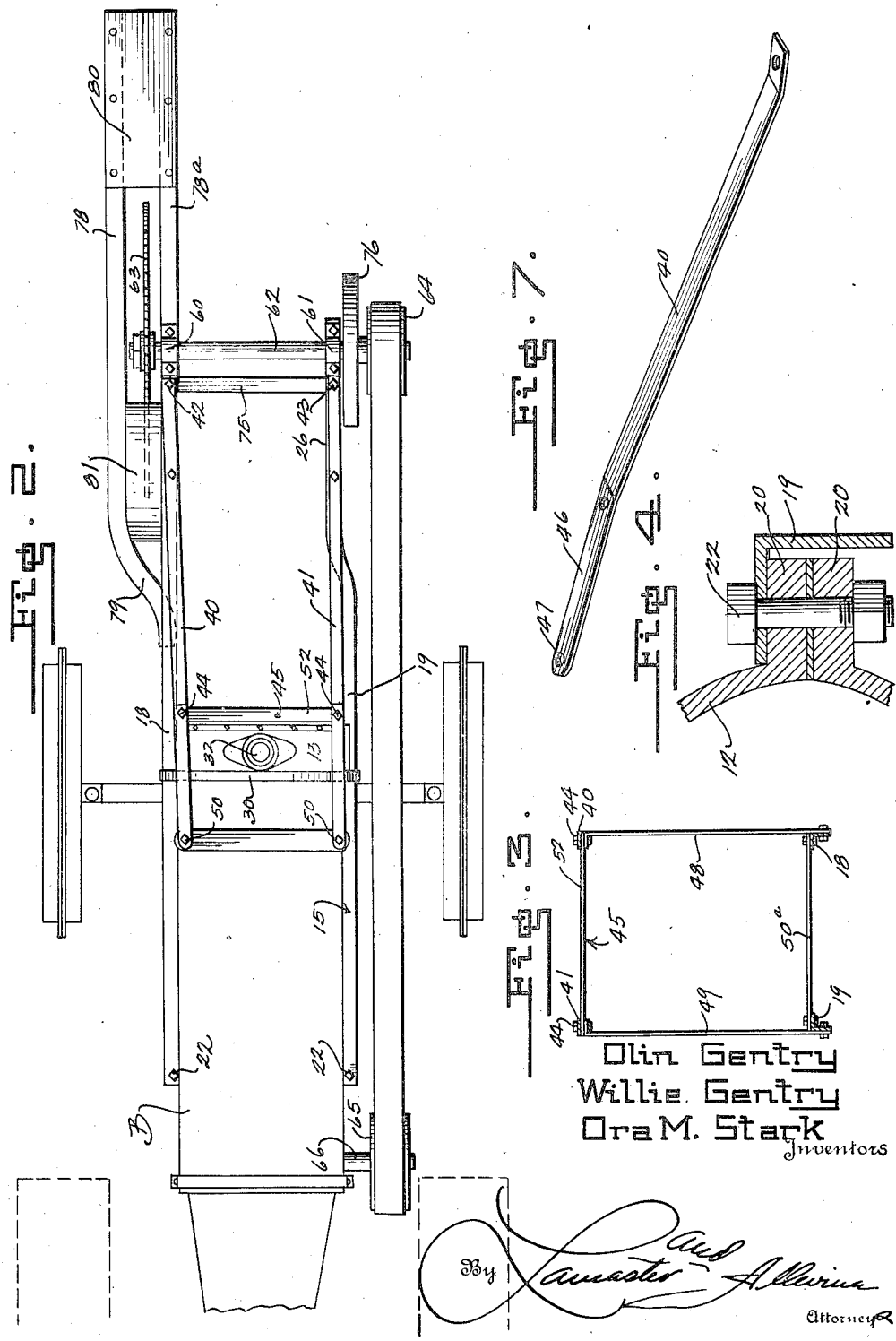

1,548,263

UNITED STATES PATENT OFFICE.

OLIN GENTRY AND WILLIE GENTRY, OF MILL GROVE, AND ORA M. STARK, OF PRINCETON, MISSOURI.

SAWING ATTACHMENT FOR FORDSON TRACTORS.

Application filed August 2, 1923. Serial No. 655,356.

*To all whom it may concern:*

Be it known that we, OLIN GENTRY, WILLIE GENTRY, and ORA M. STARK, citizens of the United States, residing at Mill Grove, Mill Grove, and Princeton, respectively, in the county of Mercer and State of Missouri, have invented certain new and useful Improvements in Sawing Attachments for Fordson Tractors, of which the following is a specification.

This invention relates to improvements in sawing attachments.

The primary object of this invention is the provision of a sawing attachment which is particularly well adapted for use upon tractors, such as the "Fordson."

A further object of this invention is the provision of a sawing attachment for tractors embodying a novel frame by means of which the same may be supported in forwardly extending and entire supported arrangement by the tractor.

A further object of this invention is the provision of a saw attachment for tractors which includes an all metal light and durable frame, which may be easily attached to the tractor without interfering with the power operation or cranking of the tractor.

A further object of this invention is the provision of a novel sawing attachment for tractors, upon the saw blade shaft of which a balance wheel is provided.

Other objects and advantages of this invention will be apparent during the course of the following detailed description.

In the accompanying drawings, forming a part of this specification, and wherein similar reference characters designate corresponding parts throughout the several views:

Figure 1 is a side elevation of a "Fordson" tractor showing the application of the improved sawing attachment thereon.

Figure 2 is a plan view of the improved sawing attachment, showing the general arrangement of parts as used in connection with a tractor.

Figure 3 is a transverse cross sectional view, showing a part of the bracing construction of the attachment frame work.

Figure 4 is an enlarged fragmentary view, partly in cross section, showing the means by which the same is attached to the crank case of the tractor.

Figure 5 is a novel type of supporting yoke, used in connection with the support of the frame work upon the front end of the tractor.

Figure 6 is a perspective view of a novel bracing detail of the sawing attachment.

Figure 7 is a perspective view of a brace used in connection with support of the improved sawing attachment from a tractor.

In the drawings, wherein for the purpose of illustration is shown but the preferred embodiment of this invention, the letter A may generally designate the improved sawing attachment which is adapted for use upon a tractor B.

Referring to the tractor B, the same preferably includes running gear 10; an engine or power unit 11 supported by the running gear 10, including a crank case 12 and a radiator construction 13.

Referring to the saw attachment A, the same preferably includes a main frame construction 15; means 16 for attaching the main frame 15 to the tractor B; and sawing means 17.

Referring to the main frame 15 the same preferably includes the elongated side rails or members 18 and 19, which are preferably of angle iron. The side rails or members 18 and 19 at their rear ends are bolted to the connecting flanges 20 of the tractor crank case 12, as by a crank case bolt 22, substantially as is illustrated in Figures 1 and 4 of the drawings. This bolted connection of the side rails 18 and 19 with the crank case 12 preferably occurs adjacent the connection of the crank case 12 with the transmission housing 25 of the tractor B. The side rail 18, which is preferably disposed at the left side of the tractor B may be of straight line formation. However, the opposite side rail 19 at the right side of the tractor B, adjacent the forward end thereof, is offset, as at 26, inwardly towards the longitudinal axis of the tractor or the main frame 15, as a means of compactly permitting the association of a balance wheel in connection with the sawing attachment. The side rails 18 and 19 are relatively long and extend for a considerable distance beyond the radiator 13 of the tractor B.

The sawing means 17 is, of course, supported by the main frame 15 at the forward end thereof and forwardly of the tractor B.

The side rails 18 and 19 of the frame 15 are supported intermediate their ends by a U-shaped yoke 30, which is preferably of steel or wrought iron, and which engages over the radiator construction 13 at the hood portion 31 thereof, just rearwardly of the filler cap 33. This yoke 30 includes the bight or arcuate portion 32 which engages over the radiator hood portion 31, and the depending side leg portions 35 and 36, which are respectively inwardly hooked, as at 37 and 38, for detachably receiving the vertical leg portions of the side rails 18 and 19 therein, substantially as is illustrated in Figure 5 of the drawings.

The main frame rails 18 and 19 are preferably also supported at their forward ends from the tractor B. The diagonal brace bars 40 and 41 are respectively attached, at 42 and 43, to the front ends of the side rails 18 and 19. These diagonal brace bars 40 and 41 extend upwardly, and are connected intermediate their ends, as by bolts 44, to a rectangular shaped vertical bracing structure 45. Each of the brace bars 40 and 41 are provided at their upper ends with a rearwardly extending portion 46, which is disposed at an obtuse angle with respect to the main diagonal portion thereof, and which, at its free end, is apertured, as at 47, for connection, as by the conventional tractor bolts 50 to the radiator structure 13 of the tractor B, at the extreme rear of the hood portion 31 of said radiator structure 13, substantially as is illustrated in Figure 1 of the drawings.

The rectangular shaped bracing structure 45 is preferably disposed in a vertical plane, and includes the vertical upright members 48 and 49 respectively connected to the side rails 18 and 19 of the main frame 15. At their lower ends, a transverse horizontal brace bar 50ª connects the rails 18 and 19, substantially as is illustrated in Figure 3 of the drawings. A transverse connecting brace bar 52 preferably connects the tops of the side bars 48 and 49 and completes the rectangular frame structure 45 to which the diagonal brace bars 40 and 41 are bolted.

A substantially V-shaped reinforcing brace 55 is provided in connection with each of the brace bars 40 and 41. Each brace 55 intermediate its ends is connected to one of the side rails 18 and 19, and extends diagonally in diverging manner, upward for connection at one end to one of the diagonal braces 40 and 41 adjacent the frame structure 45, and at another end to the diagonal brace bar 40 or 41 adjacent the forward connection of the bar 40 or 41 with the side rails 18 and 19.

At their forward ends, the side rails 18 and 19 are preferably provided with adjustable bearings 60 and 61 which receive a driven shaft 62 therein. The shaft 62 extends beyond the side rail 18 and is preferably provided with a saw blade 63 thereon which operates in a plane outwardly of the side rail 18, substantially as is illustrated in Figure 2 of the drawings. The shaft 62 likewise extends laterally of the opposite side rail 19, beyond the offset portion 26 thereof, and its outer end is preferably provided with a pulley 64 keyed thereto in any approved manner. When the saw attachment A is mounted upon the tractor B, the pulley 64 is disposed in the same plane as the drive pulley 65 which is connected by means of a shaft 66 to the power unit of the tractor B, substantially as is illustrated in Figure 2 of the drawings. A belt 67 may connect the drive pulley 65 with the saw pulley 64 in order to operate the saw blade 63. Between the driven pulley 64 and the offset portion 26 of the frame rail 19, a balance wheel 76 is positioned, which is an essential feature of any practical sawing machine.

A cross brace 75 preferably connects the side rails 18 and 19 just rearward of the saw blade shaft 62.

In order to provide a stable support forwardly of the saw blade 63, the side rail 18 is forwardly extended, as at 78ª, beyond the bearing 60. An auxiliary supporting rail or member 78, is connected, as by an inwardly offset end 79, to the rail 18, between its ends, said auxiliary rail 78 preferably extending forward in parallel relation with the rail 18 at the opposite side of the saw blade 63 with respect to the rail 18. A table 80 may be supported by the front ends of the rail extension 78ª and the auxiliary rail 78, which may be of the sliding type. This table 80, is of course supported forwardly of the saw blade 63, so that articles to be sawed may be moved into sawing relation with the blade 63. A concavo-convex metal guide member 81 may be supported by the rails 18 and 78 to the rear of the saw blade 63, substantially as is illustrated in Figures 1 and 2 of the drawings.

Referring to the means with which the improved sawing attachment A may be connected to the tractor B, it is to be noted that the frame and brace construction of the sawing attachment A is essentially a unit. The rails 18 and 19 at their rear ends are connected to the flanges of the crank case by the bolts 22. The diagonal brace members 40 and 41 are permanently secured upon the rails 18 and 19 by means of the polygonal shaped reinforcing structure 45. To attach these diagonal braces 40 and 41 to the tractor B, it is merely necessary to connect the rear ends 46 thereof to the conventional tractor bolts 50 at the top of the radiator structure 13. Preliminary to this the frame rails 18 and 19 are of course supported in the hooked ends 37 and 38 of the yoke 30 to provide an intermediate point of suspension of the main frame 15.

From the foregoing description of this invention, it is apparent that a sawing attachment for tractors has been provided, which will be very stably supported thereby to provide a sawing unit forwardly of the tractor which is driven by the power unit of the tractor. The frame, incident to its rearward connection, its forward connection, and its intermediate connection to the tractor body, is very effectively mounted upon the tractor B against liability of vibration. The supporting means holds the entire sawing attachment in suspended relation forwardly of the tractor B so that no supporting stakes need to be driven into a ground surface as a means to stabilize the sawing attachment. The frame and bracing details are preferably all of metal structure and provide a very effective and light means of supporting the sawing mechanism. The space between the side rails 18 and 19, and the vertical bracing structure 45 and the front cross brace 75 is unobstructed, so that it is relatively easy to crank the tractor B. In this connection, it is to be noted that the rectangular shaped bracing structure 45 is located immediately forwardly of the radiator 13.

Various changes in the shape, size and arrangement of parts may be made to the form of invention herein shown and described, without departing from the spirit of this invention or the scope of the claims.

We claim:

1. In combination with a tractor including a crank case, a power unit, and a radiator construction, of a sawing attachment including side rails, means connecting said side rails at their rear ends to said crank case, a yoke supported over said radiator construction and engaging said side rails forwardly of their connection with the crank case to support said side rails, an open frame positioned in front of said radiator and having its lower end portion connected with said side rails, diagonal brace members connected at their front ends adjacent the front ends of said side rails and extending upwardly therefrom and secured to the upper portion of the open frame and to said yoke and having extended end portions for connection to the radiator construction, reinforcing strips extending downwardly and forwardly from the open frame and secured to the side rails and then projected upwardly from the side rails and secured to the brace members and a sawing mechanism carried by the front end of the frame structure in operating relation with the power unit of the tractor.

2. As an article of manufacture, a sawing attachment for tractors comprising side rails adapted to be connected with opposite side portions of a tractor and extend forwardly thereof, a saw carrying shaft extending transversely of the side rails and rotatably connected with the forward end portions thereof, a yoke for straddling a tractor having depending arms engaging said side rails to support the side rails, a frame adapted to be disposed vertically in front of a tractor and having its lower end portion secured to said side rails, brace bars secured at their forward ends to said side rails and extending rearwardly at an upward incline and secured to the upper end portion of said frame and having rear end portions extending from the frame in crossed relation to the yoke and at their rear ends adapted to be secured to a portion of a tractor, and bracing members secured to the side rails in front of said frame and having upstanding forward and rear arms, the forward arms being secured to said brace bars and the rear arms being secured to the upper portion of said frame.

OLIN GENTRY.
WILLIE GENTRY.
ORA M. STARK.